United States Patent
Yui et al.

(10) Patent No.: US 6,345,916 B1
(45) Date of Patent: Feb. 12, 2002

(54) FIBER OPTIC CONNECTOR AND ITS MANUFACTURING METHOD

(75) Inventors: Dai Yui, Cary, NC (US); Kei Sunaga, Kanagawa (JP); Teruo Ikechi, Kanagawa (JP); Hidetoshi Ishida, Kanagawa (JP); Manabu Shiozaki, Kanagawa (JP); Takashi Sasaki, Kanagawa (JP); Kohei Kobayashi, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/447,576

(22) Filed: Nov. 23, 1999

(30) Foreign Application Priority Data

Nov. 25, 1998 (JP) .............................. 10-334007
Apr. 6, 1999 (JP) .............................. 11-098759
Jun. 30, 1999 (JP) .............................. 11-185984

(51) Int. Cl.$^7$ ................................................. G02B 6/36
(52) U.S. Cl. .............................. 385/80; 385/83; 385/147
(58) Field of Search ............................. 385/80, 83, 147

(56) References Cited

U.S. PATENT DOCUMENTS 4,148,559 A    4/1979  Gauthier
6,045,269 A  * 4/2000  Watanabe et al.

FOREIGN PATENT DOCUMENTS

| EP | 0859253 A1 | 7/1997 |
|----|------------|--------|
| EP | 0943942 A2 | 3/1999 |
| JP | 59-049510  | 3/1984 |
| JP | 7-218765   | 8/1995 |
| JP | 6-36004    | 5/1997 |
| JP | 9-197193   | 7/1997 |
| JP | 9-230158   | 9/1997 |
| JP | 9-325238   | 12/1997 |
| JP | 10-10352   | 1/1998 |
| JP | 10-96836   | 4/1998 |
| JP | 10-160974  | 6/1998 |
| JP | 10-213721  | 8/1998 |
| JP | 10-246838  | 9/1998 |

OTHER PUBLICATIONS

"Manufacturing of PLC–Type Highly–Dense Duplex 2X16 Splitter Modules", by A. Takagi et al., NTT Opto–electronics Laboratories, NTT Access Network System Laboratories (with English translation), 1997.

* cited by examiner

Primary Examiner—Hung N. Ngo
(74) Attorney, Agent, or Firm—McDermott, Will & Emery

(57) ABSTRACT

The present invention provides a fiber optic connector comprising a fiber pressing member and a substrate having a part A with multiple fiber arranging grooves in which bare portion of optical fibers are fixed, and a part B in which coated portion of optical fibers are fixed, and its manufacturing method. The connector enables to prevent an increase in transmission loss or breakage of the optical fibers by reducing the localized stress on the fibers from the rear end of the fiber pressing member and the rear end edge of the fiber arranging grooves.

10 Claims, 15 Drawing Sheets

(A)

(B)

(C)  (D)

(A)

(B)

(A)

(B)

(A)

(B)

(A)

(B)

(C)

(D)

US 6,345,916 B1

FIBER OPTIC CONNECTOR AND ITS MANUFACTURING METHOD

BACKGROUND OF THE INVENTION (i) Field of the Invention

The present invention relates to a fiber optic connector having an optical fiber fixed therein for connecting an optical fiber to an optical device, such as an optical waveguide, and its manufacturing method.

(ii) Description of Related Art

A fiber optic connector wherein optical fibers are fixed to a substrate is used as a fiber optic connector attached to an optical device, such as an optical waveguide.

FIG. 20 is an explanatory diagram of the fiber optic connector disclosed in Japanese Patent Laid Open Publication No. 10-160974.

In this fiber optic connector, only a part of the bare portion 5a and 5b of optical fibers are fixed to a grooved substrate but the other portion of the optical fibers including the coated portion 5b and 6b of upper and lower fiber ribbons 5 and 6 are not fixed to a grooved substrate 1.

As a result, the bare portion of optical fibers easily can be damaged when they touch an edge of the substrate or the like.

Therefore, the coated portion of optical fibers as well as the bare portion of optical fibers in which the coatings have been removed are usually fixed to a substrate in a fiber optic connector.

FIG. 16 shows one example of such a fiber optic connector.

As shown in FIG. 16(A), a part (called "part A") for fixing the bare portion of optical fibers and a part (called "part B") for fixing the coated portion of optical fibers are built onto the substrate 1, fiber arranging grooves 1c are formed in the upper surface of part A 1a, and part B 1b is formed at a different level than part A 1a.

As shown in FIG. 16(B), in order to fix optical fibers 3 onto a substrate, with the bare portions 3a of the optical fibers 3 arranged in the fiber arranging grooves 1c and pressed down from above by a fiber pressing member 2, an adhesive 4 is injected around the bare portion of the optical fibers between the fiber arranging grooves 1c and the fiber pressing member 2 and also around the bare portion 3a and the coated portion 3b of the optical fibers 3 placed on part B 1b.

An illustration of the adhesive is omitted from FIG. 16(B).

Usually, the outside diameter of a bare portion 3a of the optical fiber is approximately 125 μm and the outside diameter of the coated portion 3b of the optical fiber is approximately 250 μm.

Therefore, if a step down is built between part A 1a and part B 1b of the substrate so that the difference in the level of the centers of bare portion 3a in the fiber arranging grooves 1c and the level of the upper surface of part B 1b of the substrate is approximately 125 μm, the center of the optical fibers fixed to the substrate will follow an approximately straight line, as shown in FIG. 16(C).

In order to connect to a waveguide or the like, the end faces of the bare portion of optical fibers are ground, usually, at a slant, for example at an angle of 8° relative to a plane perpendicular to the axis of the optical fibers so as to reduce the occurrence of reflected light.

However, it is difficult to align the position of the fibers as shown in FIG. 16. If the position of the optical fibers at the rear end of the fiber arranging grooves 1c shifts upward or downward, the bare portion of optical fibers 3a will contact either the rear edge of the fiber arranging grooves 1c or the rear edge of the fiber pressing member 2 resulting in damage to the bare portion of the optical fiber. The bare portion of optical fibers may also be stressed locally by the expansion or contraction of the adhesive due to heat.

The above problems are particularly striking in double-density fiber optic connectors. Here, double-density fiber optic connectors shall mean high-density fiber optic connectors wherein the sequencing density of the optical fibers is set to double the conventional density, for example the connectors described in 1997 *Electronic Communication Information Association General Meeting, Preliminary Lectures,* Takagi et.al., C-3-15, "PLC High-Density Double 2×16 Splitter Module Production."

Two optical fiber ribbons, an upper and lower, are used in these double-density fiber optic connectors. The bare portion of optical fibers in the upper fiber ribbon are inevitably raised to form a gap between the bare portion and the substrate.

This gap is then filled with adhesive to set the upper and lower optical fibers, demanding a relatively large amount of adhesive. Therefore, the influence of any expansion or contraction of the adhesive due to heat is greater than in the case of normal density fiber optic connectors.

FIG. 17 shows one example of a double-density fiber optic connector. A fiber arranging groove of half the pitch of the fiber arranging groove 1c shown in FIG. 16 is formed on the substrate 1.

The fiber ribbons 5 and 6 are composed of plural optical fibers having its bare portion (i.e. glass portion) with an outside diameter of 125 μm coated with a protective coating such that their outer diameter becomes 250 μm. The optical fibers are arranged at intervals of 250 μm and covered with a common coating to form a fiber ribbon.

As a result, if the common coating and the protective coating are removed at the tips, the bare portion of optical fibers are aligned with 125 μm gaps between them. By shifting the upper and lower fiber ribbons 5 and 6 apart horizontally by 125 μm and layering them on top of each other, the upper and lower bare portion of optical fibers 5a and 6a fit alternately in their respective gaps. Seen in a planar view, the bare potion of optical fibers 5a and 6a of the upper and lower fiber ribbons are lined up perfectly straight in alternating pairs. But viewed from the side, the bare portion of optical fibers 5a and 6a are bent with their front ends pressed down by the fiber pressing member 2 and fixed to the substrate 1 by an adhesive. In this way, a double-density fiber optic connector is obtained.

FIG. 18 shows a double-density fiber optic connector wherein two upper and two lower fiber ribbons have been attached. In the figure, the fiber optic connector comprises 16 fibers arranged in four fiber ribbons, two above and two below.

However, a fiber optic connector with 32 optical fibers can also be made using eight fiber ribbons each having 4 optical fibers.

If the fiber optic connector of FIG. 18 is observed at in a planar view, the bare potion of optical fibers 5a and 6a of the upper and lower fiber ribbons are lined up perfectly straight in alternating pairs. However, if it is viewed from the side the bare potion of optical fibers 5a and 6a are bent with their front ends pressed down by the fiber pressing member 2 and fixed to the substrate 1 by an adhesive.

FIG. 19 shows the fixed condition of the bare potion of optical fibers in the double-density fiber optic connectors of FIGS. 17 and 18. The tips of the bare portion of optical fibers 5a and 6a of the upper and lower fiber ribbons 5 and 6 are fixed at the same height, but the positions of the bare portion of optical fibers within the upper and lower fiber ribbons differ. As a result, the bare portion of optical fibers 5a of the lower fiber ribbon 5 stretch and extend toward part A 1a of the substrate 1 while bending upward and the bare portion of optical fibers 6a of the upper fiber ribbon 6 extend toward part A 1a of the substrate 1 while bending downward, as shown in FIG. 19(A). The bare portion of optical fibers 5a of the lower fiber ribbon 5 can also be made perfectly straight, but in that case it is necessary to increase the bend in the bare portion of optical fibers 6a of the upper fiber ribbon 6 more than that shown in FIG. 19(A).

In either case, upward and/or downward bends in the fibers result.

If the radius of curvature of these bends is small and the bare portion of optical fibers are fixed in this condition, they may break due to static fatigue.

In order to increase the radius of curvature, it is necessary to lengthen the bare portion of optical fibers 5a and 6a from part A 1a of the substrate 1 to the coated portion 5b and 6b to a certain extent.

However, when the fibers are lengthened the substrate 1 must also be lengthened, which increases costs.

In FIG. 19(B) the bare portion of optical fibers 5a and 6a are portrayed as perfectly straight at the edge of the rear end of the fiber arranging grooves 1c and the edge of the rear end of the fiber pressing member 2. However, since the bare portion 5a and 6a of optical fibers are bent upward and downward respectively as mentioned above, they may be damaged or receive localized stress, if they contact the rear end edges.

As a result, if they contact the rear end edges, the bare portion of optical fibers may be damaged or receive localized stress.

Further, in the fiber optic connector described in Japanese Laid Open Patent Publication No. 10-96836, a construction that prevents breakage of the optical fibers is employed by rounding the edge of the rear end of the fiber pressing member that presses down multiple fibers placed on the fiber arranging grooves to cushion contact with the fibers.

However, the effect on the bare portions of the optical fibers from the rear end edge of the fiber arranging grooves is not improved. In particular, as shown in FIG. 19 of the above Patent, when two layered fiber ribbons are used and fixed such that the bare portion of optical fibers of the lower layer descend, the problem of localized stress on the bare portion of optical fibers is great because they are pushed down by the rear end edge of the fiber arranging grooves.

In both the multiple fiber connector of Japanese Laid-Open Patent Publication No. 9-197193 and the fiber optic connector of Japanese Laid-Open Patent Publication No. 10-10352, localized stress on the bare potion of optical fibers from the rear end edge of the fiber arranging grooves due to the hardening contraction of the adhesive or the expansion and contraction of the adhesive due to a temperature cycle cannot be avoided because the bare portion of optical fibers from which the coating has been removed are in contact with the rear end edge of the fiber arranging grooves. This stress is increased if the arrangement of the fibers is skewed on the fiber arranging grooves during assembly.

FIG. 21 is an explanatory diagram of the stress on the bare portion of optical fibers from the rear end of the fiber arranging grooves. 1 is a substrate, 1a is part A for fixing bare portion of optical fibers, 1b is part B for fixing a coated portion, 3b is a coated portion, and 3a is a bare portion of optical fiber. As shown in FIG. 21(A), if the bare portion of optical fibers 3a of the fiber ribbon are bent downward at the rear end 1a of part A of the substrate 1, the bare portion of optical fibers 3a are locally stressed at the points P shown in FIG. 21(B).

In this way, in conventional fiber optic connectors, the bare portion of optical fibers from which the coating has been removed are fixed using a method such that they are locally stressed by the rear end edge of the fiber pressing member and by the rear end edge of the fiber arranging groove, damage to the fibers increases, and there is a danger this will lead to breakage.

SUMMARY OF THE INVENTION

In view of the above-mentioned problems, the present invention is made in order to provide a fiber optic connector that comprises a substrate comprising part A with multiple fiber arranging grooves for fixing bare portion of optical fibers and part B for fixing the remaining portion of the bare portion of the optical fibers and coated portion of the optical fibers, and that can prevent an increase in transmission loss and breakage of optical fibers by reducing the localized stress on the bare portion of the optical fibers from the rear end of a fiber pressing member thereof and the rear end edge of the fiber arranging grooves on the substrate thereof, and its manufacturing method.

A first embodiment of the present invention is a fiber optic connector comprising a substrate and a pressing member, wherein one or more optical fibers are fixed in a manner that at least part of bare portion of one or more optical fibers are fixed with an adhesive under the fiber pressing member and respectively in one or more fiber arranging grooves which are formed on a part of the substrate, and the remaining bare portion of the optical fibers are fixed with the adhesive such that they are stuck in the fiber arranging grooves, which extend to the rear of the fiber pressing member, within a designated range at the rear of the fiber pressing member but gradually separate from the fiber arranging grooves beyond the end of the designated range, and the coated portion of the optical fibers are fixed with the adhesive at a slant position on or above the horizontal surface of the remaining part of the substrate.

A second embodiment of the present invention is a fiber optic connector comprising a substrate having one or more fiber arranging holes, wherein one or more optical fibers are fixed in a manner that at least part of bare portion of the optical fibers are fixed with an adhesive respectively in the fiber arranging holes formed in a part of the substrate and the remaining bare portion of the optical fibers are fixed with the adhesive such that they are stuck in fiber arranging grooves, which are formed continuously to the fiber arranging holes on the part of the substrate, within a designated range at the rear of the fiber arranging holes but gradually separate from the fiber arranging grooves beyond the end of the designated range, and the coated portion of the optical fibers are fixed with the adhesive at a slant position on or above the horizontal surface of the remaining part of the substrate.

The fiber optic connectors according to the first and second embodiments of the present invention differ each other only in their means of fixing the bare portion of the optical fibers: by a fiber pressing member or by fiber arranging holes, but are substantially the same in all other points.

Optical fibers used in the present invention may be either in the form of an optical fiber ribbon or a plurality of single optical fibers separately arranged without a common coating.

The present invention is useful for suppressing the occurrence of localized stress on the bare portion of optical fibers (i.e. the portion of optical fibers in which the coating has been removed) from the fiber pressing member or the fiber arranging holes of fiber optic connectors. Furthermore, even if the adhesive expands and contracts or the position of optical fibers shifts in the fiber arranging grooves, the present invention enables to prevent an increase in loss or damage to the bare portion of optical fibers because there is no such direct contact between the edge of the rear end of part A of the substrate and the bare portion of optical fibers with each other as causes localized stress on the bare portion of optical fibers.

An aspect of manufacturing method of a fiber optic connector according to the present invention is characterized in that one or more optical fibers from which the coatings in their front tips have been removed to expose their glass portion are lowered with an angle of not less than 2° maintained between the central axis of the optical fibers and the upper surface of the substrate, and are fixed to the substrate at an angle formed as small as possible, not exceeding 20°, between the central axis of coated portion of the optical fibers and the upper surface of the substrate in a manner that at least part of bare portion of one or more optical fibers are fixed with an adhesive under the fiber pressing member and respectively in one or more fiber arranging grooves which are formed, extending to the rear of the fiber pressing member, on a part of the substrate, and the remaining bare portion of the optical fibers are fixed with the adhesive such that they are stuck in the fiber arranging grooves within a designated range at the rear of the fiber pressing member but gradually separate therefrom beyond the designated range, and the coated portion of the optical fibers are fixed with the adhesive at a slant position on or above the upper surface of the remaining part of the substrate.

Another aspect of manufacturing method of a fiber optic connector according to the present invention is characterized in that one or more optical fibers from which the coatings in their front tips have been removed to expose their glass portion are lowered with an angle of not less than 2° maintained between the central axis of the optical fibers and the upper surface of the substrate, and are fixed to the substrate at an angle formed as small as possible, not exceeding 20°, between the central axis of coated portion of the optical fibers and the upper surface of the substrate in a manner that at least part of bare portion of the optical fibers are respectively fixed with an adhesive in the fiber arranging holes formed in a part of the substrate and the remaining bare portion of the optical fibers are fixed with the adhesive such that they are stuck in fiber arranging grooves, which are formed continuously to the fiber arranging holes on a part of the substrate, within a designated range at the rear of the fiber arranging holes but gradually separate therefrom beyond the designated range, and the coated portion of the optical fibers are fixed with the adhesive at a slant position on or above the upper surface of the remaining part of the substrate. Thus, a fiber optic connector in which the occurrence of localized stress on the bare portion of optical fibers from the fiber pressing member or the fiber arranging holes is suppressed, can be manufactured as described above. Furthermore, even if the adhesive expands and contracts or the position of optical fibers shifts in the fiber arranging grooves, the present invention enables to prevent an increase in loss or damage to the bare portion of optical fibers because there is no such direct contact between the edge of the rear end of part A of the substrate and the bare portion of optical fibers as causes localized stress on the bare portion of optical fibers.

The above and further objects and novel features of the invention will be more fully clarified from the following detailed description when the same is read in connection with the accompanying drawings. It is to be expressly understood, however, that the drawing is for the purpose of illustration only and is not intended as a definition of the limits of the invention.

BRIEF DESCRIPTION OF THE DRAWINGS

In order to more fully understand the drawings used in the detailed description of the present invention, a brief description of each drawing is provided.

FIG. 1(A) is a perspective view of the substrate and the fiber pressing member; FIGS. 1(B)–(D) are lateral views of the assembly process; and FIG. 1(E) is a lateral explanatory diagram showing the angle at which the optical fibers are set.

FIG. 3(A) is a lateral view of the substrate; FIG. 3(B) is a lateral view of the connector when assembled.

FIG. 7(A) is a perspective view; FIG. 7(B) is a lateral view; FIG. 7(C) is a cross section of the A—A line and B—B line in FIG. 7(B) and a diagram explaining a height difference h between the central axis of optical fibers and the upper surface S of part B of the substrate; FIG. 7(D) is a cross section of the C—C line in FIG. 7(B).

FIG. 8(A) is a perspective view; FIG. 8(B) is a lateral view.

FIGS. 9(A) and 9(B) are explanatory diagrams showing the depth of the cuts.

FIG. 11(A) is a perspective view; FIG. 11(B) is a lateral view.

FIG. 12(A) is a perspective view; FIG. 12(B) is a lateral view.

FIG. 13(A) is a perspective view; FIG. 13(B) is a cross section along the D–E–F line in FIG. 13(A).

FIG. 16(A) is a perspective view before the optical fibers are placed; FIG. 16(B) is a perspective view with the fibers grasped; and FIG. 16(C) is vertical cross section along the axis of the fibers.

FIG. 19(A) is a cross section along the axis of the fibers before coating with adhesive; FIG. 19(B) is the same cross section after coating with adhesive.

FIG. 20(A) is an assembly diagram; FIG. 20(B) is a lateral view; FIG. 20(C) is a cross section along the C—C line in FIG. 20(A); and FIG. 20(D) is a cross section along the D—D line in FIG. 20(B).

FIG. 21(A) is a lateral view; FIG. 21(B) is a cross section along the B—B line in FIG. 21(A).

DESCRIPTION OF THE PREFERRED EMBODIMENT

Figure 1:
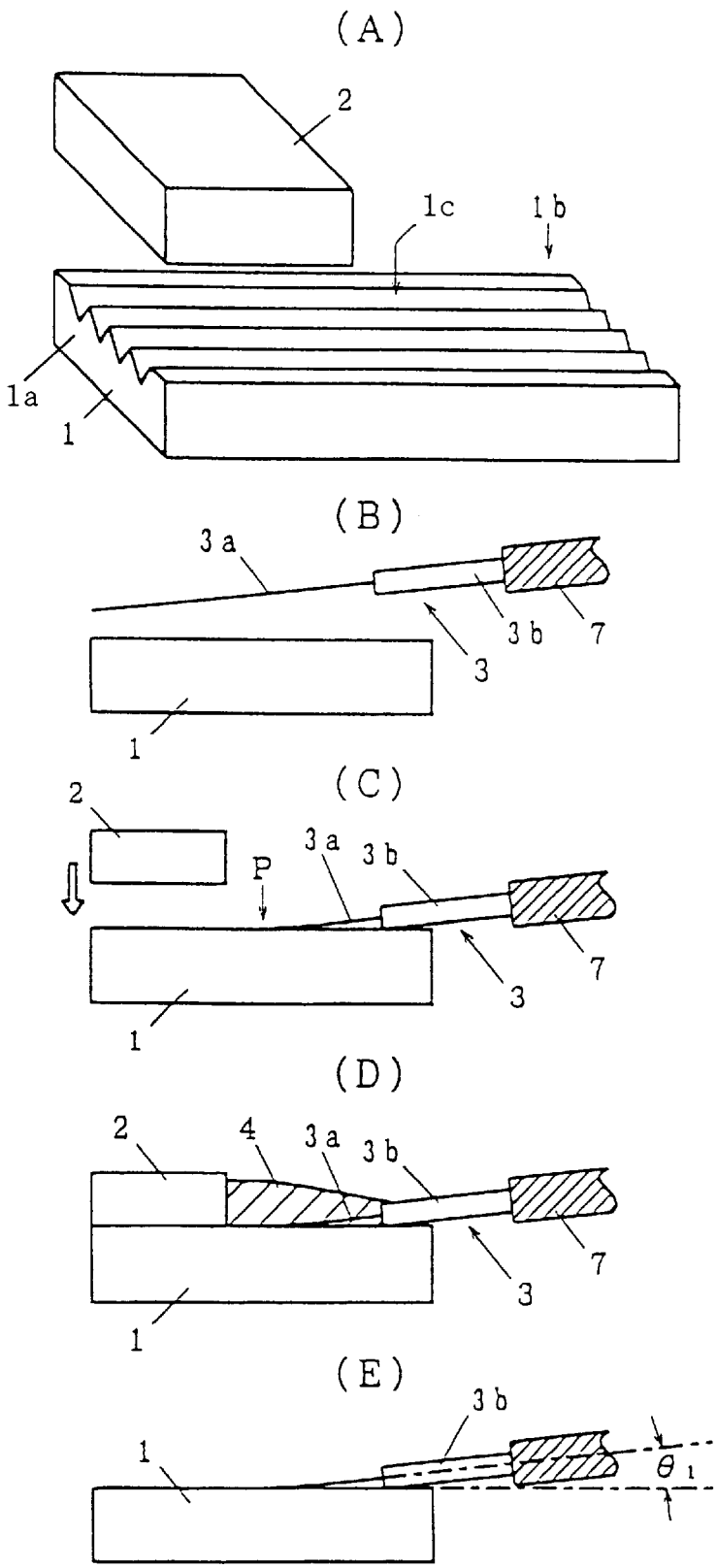
FIG. 1 shows a first embodiment of the fiber optic connector of the present invention.

In the following, preferred embodiments of the present invention will be explained in detail with reference to the accompanying drawings. To facilitate the comprehension of the explanation, the same reference numerals denote the same parts, where possible, throughout the drawings and repeated explanations will be omitted. The dimensions in the drawing are partly exaggerated and do not always correspond to actual ratios of dimensions.

Figure 2:
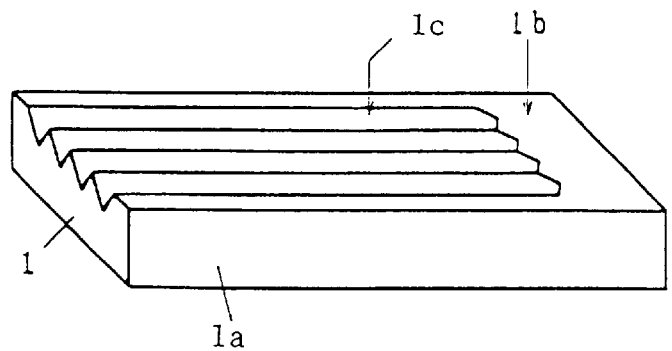
FIG. 2 is a perspective view showing an example of an alternate form of the substrate.

FIG. 1 shows a first embodiment of the fiber optic connector of the present invention. Fiber arranging grooves 1c comprising V-shaped grooves have been formed in a substrate 1 extending the length of the substrate. The rear end area of the substrate 1 functions as part B of the substrate for fixing the optical fibers, but the range of part B is by no means definitely delineated. In fact, in the present embodiment, the fiber arranging grooves 1c extend the entire length of the substrate 1, but as shown in FIG. 2, the arranging grooves 1c do not need to extend past the rear end area where the bare portion of optical fibers will not be placed. A fiber pressing member 2 is shorter than the length of the fiber arranging grooves 1c and presses down the bare portion of optical fibers placed in the fiber arranging grooves 1c in the front end area of the substrate 1.

Now the assembly method of the fiber optic connector will be explained. As shown in FIG. 1(B), one or more optical fibers 3 from which the coating of coated portion 3b has been partly removed to expose the bare portion 3a of optical fibers are held by a holding tool 7, maintained at an angle of $\theta_1$ to the surface of the substrate 1, and are lowered onto the substrate 1. Angle $\theta_1$ is the angle formed by the central axis of the optical fibers 3 held within the holding tool 7 and the upper surface of the substrate 1, as shown in FIG. 1(E). The holding tool 7 can grasp, for example, by pinching a coated portion 3b of an optical fiber 3 and a structure that grasps coated portion 3b of plural fibers simultaneously can be used if plural optical fibers are set.

When the optical fibers have been lowered until the bare portion 3a of optical fibers are stuck in the fiber arranging grooves to a designated length that is longer than the length of the pressing member 2, they are pressed down by the pressing member 2 as shown in FIG. 1(C). In this condition, the bare portion 3a of optical fibers are stuck in the fiber arranging grooves up to point P and gradually separate from the fiber arranging grooves beyond point P. The bare portion of optical fibers that separates from the fiber arranging grooves describes a curve, but near the front end of the coated portion 3b, they approach a straight line in agreement with the axis of the optical fibers where they are held by the holding tool 7. In order to make a designated length of the bare portion 3a of optical fibers contact the substrate 1 such that it is longer than the length of the pressing member 2 put on the front end of the bare portion of optical fibers before the coated portion 3b of the optical fibers 3 touch the substrate, $\theta_1$ must be greater than a certain value.

If the optical fibers are fixed in the condition where the angle $\theta_1$ is increased and the radius of curvature of bare portion 3a of optical fibers that are curved becomes smaller, then it may cause breakage of the optical fibers due to static fatigue. According to calculations and experiments conducted by the present inventors, if the radius of curvature is over 20 mm, the estimated rate of breakage over 30 years is less than 1% and the durability in practical use can be guaranteed. In the case of this embodiment, if $\theta_1$ is less than about 20°, the radius of curvature of the bend in the bare portion 3a of optical fibers can be set at greater than about 20 mm. Therefore, if $\theta_1$ is initially greater than 20°, $\theta_1$ should be set to become as small as possible under 20° after fixing the fibers.

Because the bare portion 3a of optical fibers are stuck in the fiber arranging grooves 1c from the rear end of the fiber pressing member 2 to the point P in the same straight lines as the bare portion 3a of optical fibers pressed down by the fiber pressing member 2, there is no stress applied on the bare portion of optical fibers at the rear end edge of the fiber pressing member 2.

With this condition maintained, the optical fibers are coated with an adhesive 4 as shown in FIG. 1(D) and hardened to produce the fiber optic connector. The adhesive may be a UV hardening adhesive. If the optical fibers are fixed to the substrate in this order, the bare portion 3a of optical fibers bend upward from behind the fiber pressing member and the localized stress from the rear end edge of the fiber pressing member 2 can be kept to an extremely small amount even if there occurs an expansion or contraction of the adhesive or a heat distortion of the substrate. It is also unnecessary to process a curved surface on the rear end edge of the fiber pressing member, allowing a reduction in production costs.

A concrete example will now be explained. In this case 13 mm in length of the coating of an optical fiber is removed, a 5 mm portion from the front end of the coated portion 3b is held by the holding tool 7, and the optical fibers are lowered onto the substrate at an angle of $\theta_1$. If the substrate 1 is 15 mm long and the bare portion 3a of optical fibers are accommodated on the upper surface of the substrate, the bare portion of optical fibers are almost hidden in the grooves because fiber arranging grooves 1c are formed in the upper surface of the substrate 1 with a depth such that the bare portion of optical fibers protrude only slightly. As the optical fibers 3 are lowered, the bare portion 3a of optical fibers begin to come into contact with the fiber arranging grooves from the front end of the substrate. If the bare portion 3a of optical fibers within the fiber arranging grooves are fixed by a fiber pressing member 2 with a length of 4 mm, in order that the rear end edge of the fiber pressing member 2 does not damage the bare portion of optical fibers, the bare portion of optical fibers must stick in the fiber arranging grooves in a straight line across a length of more than 4 mm from the front end of the substrate. In the case of this example, when the length of the bare portion of optical fibers that was a straight line was 4.5 mm and the optical fibers were lowered to the point where the front end of the coated portion hit a plane of the same height as the upper surface of the substrate, at that time the angle formed by the central axis of the optical fibers held within the holding tool 7 and the surface of the substrate 1 was 4°. Therefore, if the optical fibers are lowered onto the substrate maintaining $\theta_1$ at over 4°, the optical fibers can be lowered until the 4.5 mm portion of the front end of the bare portion of optical fibers forms a straight line. The bigger the $\theta_1$ as the fibers are lowered onto the substrate, the easier this operation is, but after fixing, $\theta_1$ must be made as small as possible under 20°. Afterwards, the bare portion of optical fibers may be aligned in the fiber arranging grooves 1c on the substrate 1 and pressed down by the fiber pressing member 2.

Figure 3:
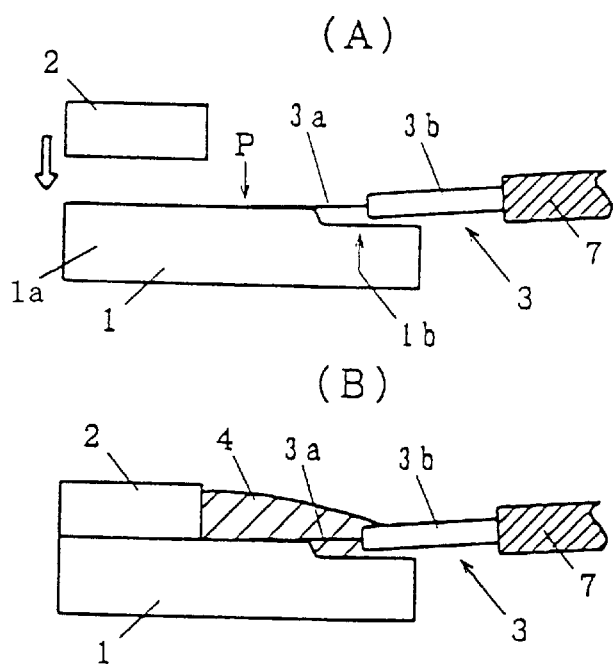
FIG. 3 shows a second embodiment of the fiber optic connector of the present invention.

FIG. 3 shows the second embodiment of the fiber optic connector of the present invention. In this embodiment, a step is formed between part A and part B of the substrate. By positioning the coated portion 3b in part B, the coated portion 3b can be lowered to a lower position than if there is no step. By doing so, $\theta_1$ can be decreased and the radius of curvature of the bend in the bare portion of optical fibers can be increased if the length of coating removed is the same. Alternatively, if the radius of curvature of the bend in the bare portion of optical fibers is left the same, the length of coating removed can be decreased and the length of the substrate can be decreased accordingly.

Figure 4:
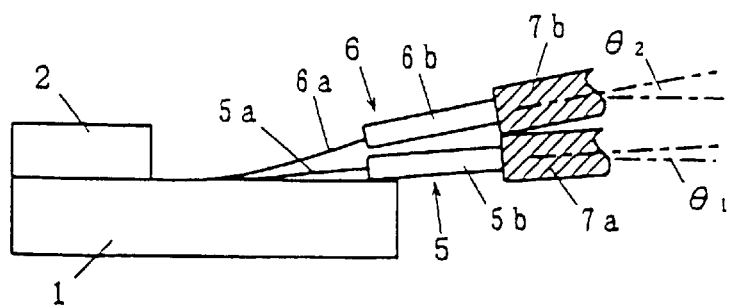
FIG. 4 is a lateral view showing a third embodiment of the fiber optic connector of the present invention.

FIG. 4 shows the third embodiment of the fiber optic connector of the present invention. 5 and 6 are fiber ribbons, 5a and 6a are bare portion of optical fibers, 5b and 6b are coated portion, and 7a and 7b are holding tools. A depiction of the adhesive has been omitted from FIG. 4.

In this embodiment, two fiber ribbons are used as the optical fibers. The two fiber ribbons 5 and 6 are layered on top of each other and fixed by the fiber pressing member 2 at the front ends of the bare portion of optical fibers such that the upper and lower bare portion of optical fibers 5a and 6a are lined up on a plane in alternating pairs.

In this embodiment, there is a further limitation on the angle formed by the central axis of the optical fibers and the surface of the substrate as the optical fibers are lowered onto the substrate. When using a substrate and a fiber pressing member with the same lengths as in the example of the first embodiment, the bare portion of optical fibers are straight for 4.5 mm from the front end of the substrate and the angle $\theta_1$ at which the optical fibers are lowered until the bare portion of optical fibers are stuck in the fiber arranging grooves 1c must be over 4° for the lower fiber ribbon 5, and the angle $\theta_2$ must be over 8° for the upper fiber ribbon 6. Therefore, the upper and lower fiber ribbons 5 and 6 descend to the substrate held at differing angles and the bare portion of optical fibers are aligned in the fiber arranging grooves and fixed with adhesive after the fiber pressing member 2 is loaded.

Figure 5:
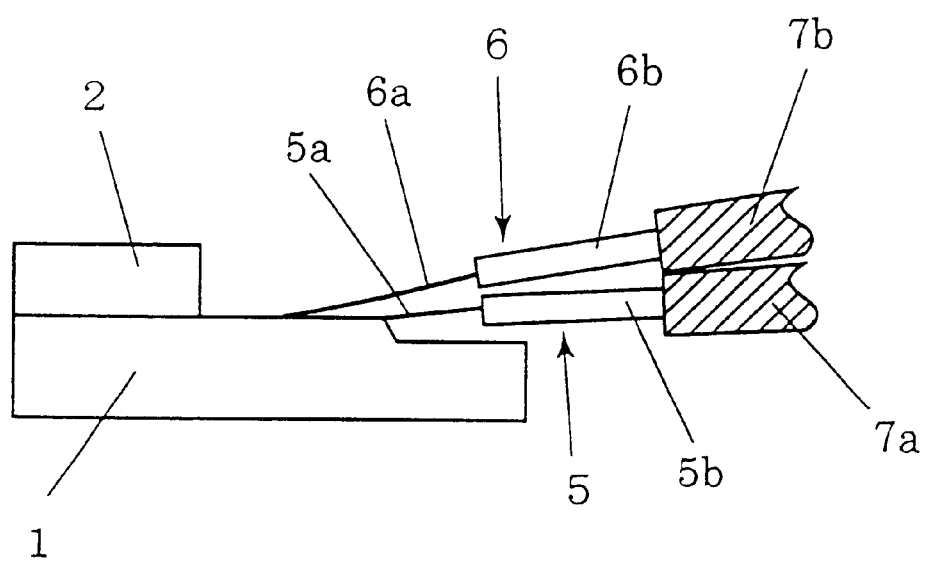
FIG. 5 is a lateral view showing a fourth embodiment of the fiber optic connector of the present invention.

FIG. 5 shows the fourth embodiment of the fiber optic connector of the present invention. An illustration of the adhesive is omitted from FIG. 5. In this embodiment, as in the second embodiment, a step is formed between part A and part B of the substrate. By placing the coated portion 5b of the lower fiber ribbon 5 on part B as formed above, the coated portion 5b can be placed lower than if there were no step and the angle $\theta_1$ at which the fiber ribbon 5 is held can be decreased. Further, the angle $\theta_2$ of the upper fiber ribbon 6 can also be decreased. As a result, the radius of curvature of the bends when the optical fibers are fixed can be increased. Or, if in this case the radius of curvature of the bend is not altered, the length of coating that must be removed can be decreased and the substrate can also be decreased accordingly.

Figure 6:
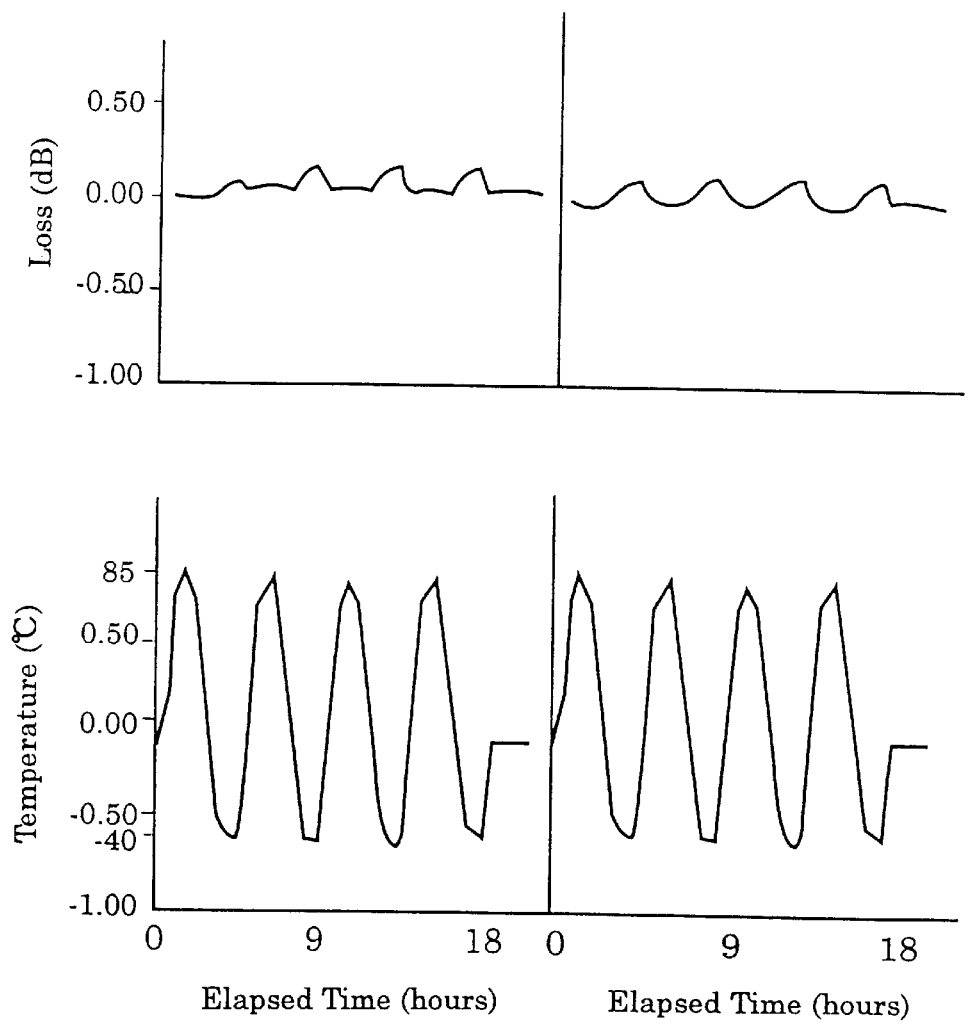
FIG. 6 is an explanatory view of the temperature characteristics when a heat cycle is applied to the connector of the present invention connected to a silica waveguide.

The upper portion of FIG. 6 is a graph showing the temperature characteristics when the heat cycle shown in the lower portion of FIG. 6 is applied to a device in which the double-density fiber optic connector of the fourth embodiment (with the tips of the bare portion of optical fibers ground down to a slanted surface), where $\theta_1=3°$, $\theta_2=8°$, and the step=0.1 mm, is connected to a Wavelength Insensitive Coupler (WINC) silica waveguide. The graph on the left shows insertion loss change on the through port and the graph on the right shows insertion loss change on the cross port. In conventional devices, the greatest loss change was 0.4 dB, but this is reduced to under 0.2 dB with the present invention. The increase in loss seen during low temperatures is thought to be caused by localized stress on the fibers due to contraction of the adhesive, but the reduction of the loss change shows that the stress from the rear end edge of the fiber pressing member was reduced.

In each of the above embodiments, in order to decrease angle $\theta_1$ or angle $\theta_2$, the length of coating removed may be increased, the substrate may be lengthened accordingly, and the position where the coated portion is held may be moved back. However, lengthening the substrate increases the materials cost and increases the size of the entire module. It is preferable to remove 10 mm or less in length of the coating. Therefore, in practical use the angles $\theta_1$ and $\theta_2$ cannot be less than around 2°. On the other hand, with the length of coating removed at less than 10 mm, in order to set the radius of curvature of the bend at greater than 20 mm when the optical fibers are fixed, the angles $\theta_1$ and $\theta_2$ must be less than 20°. The angle formed by the surface of the substrate and the central axis of the optical fibers fixed to the substrate should be designated less than 20°, as small as possible.

Figure 17:
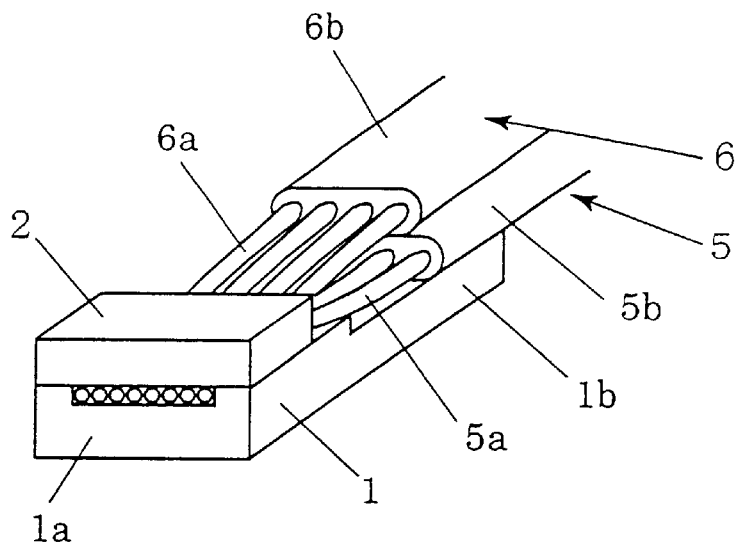
FIG. 17 is a perspective view of one example of a double-density fiber optic connector.
Figure 18:
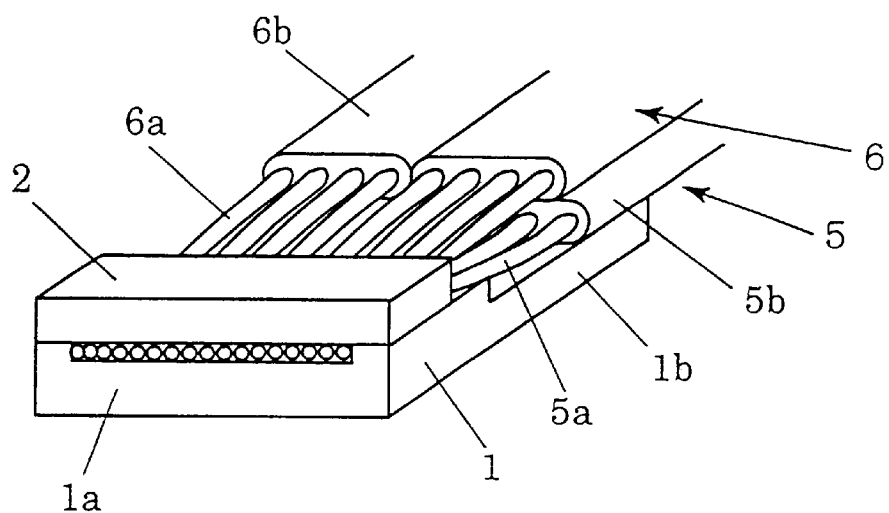
FIG. 18 is a perspective view of one example of a double-density fiber optic connector wherein two upper and two lower fiber ribbons have been layered and attached to the connector.
Figure 19:
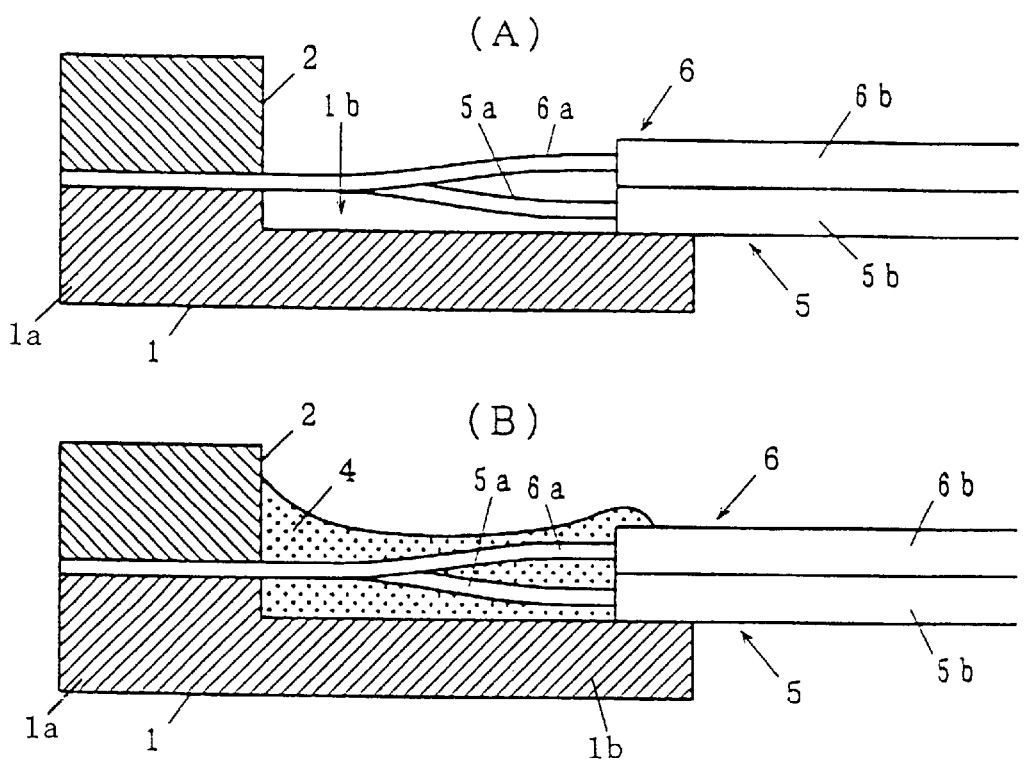
FIG. 19 shows how the bare portion of optical fibers are fixed in the fiber optic connectors of FIGS. 17 and 18.
Figure 20:
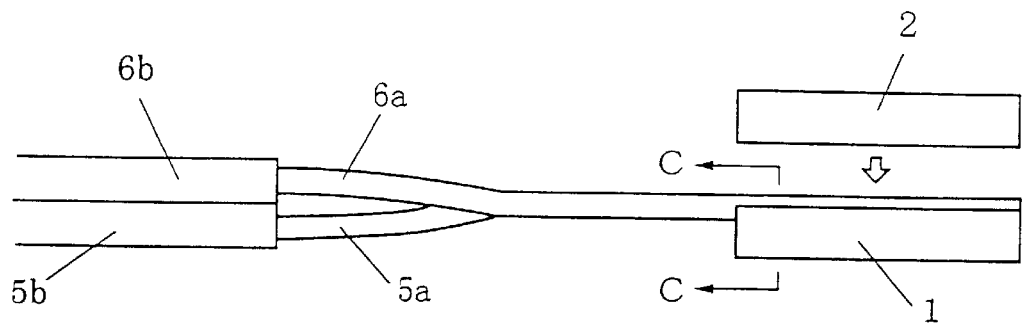
FIG. 20 shows the fiber optic connector disclosed in Japanese Laid-Open Patent Publication No. 10-160974.
Figure 20:
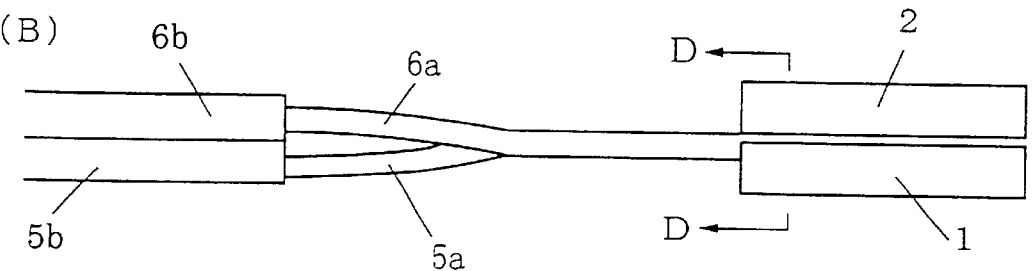
Figure 20:
Figure 20:
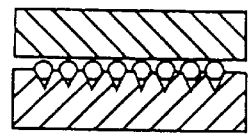
Figure 21:
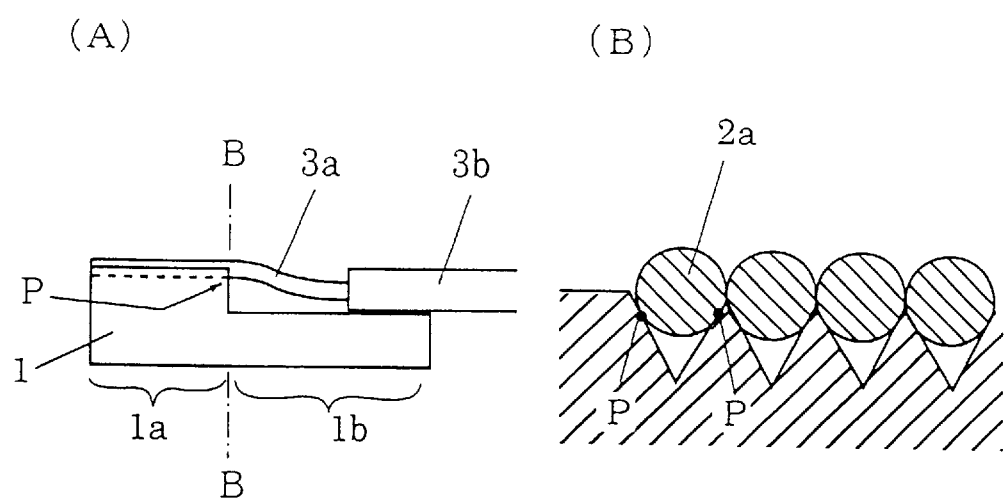
FIG. 21 is for explaining the stress on the bare portion of optical fibers from the rear end of the fiber arranging guide.

When using two fiber ribbons, in conventional fiber optic connectors wherein the coated portion of the optical fibers are layered on top of each other virtually horizontally as shown in FIGS. 17–19, the rate of breakage due to damage caused by contact with the rear end edge of the fiber pressing member was 5–10%. However, as mentioned above, by designing the connector such that the bare portion of optical fibers are stuck within fiber arranging grooves in a designated range at the rear of the fiber pressing member and then gradually separate from the fiber arranging grooves at the rear end of that designated range and the coated portion on part B of the substrate is placed aslant to the fiber arranging grooves, the breakage rate was reduced to almost 0%.

Figure 7:
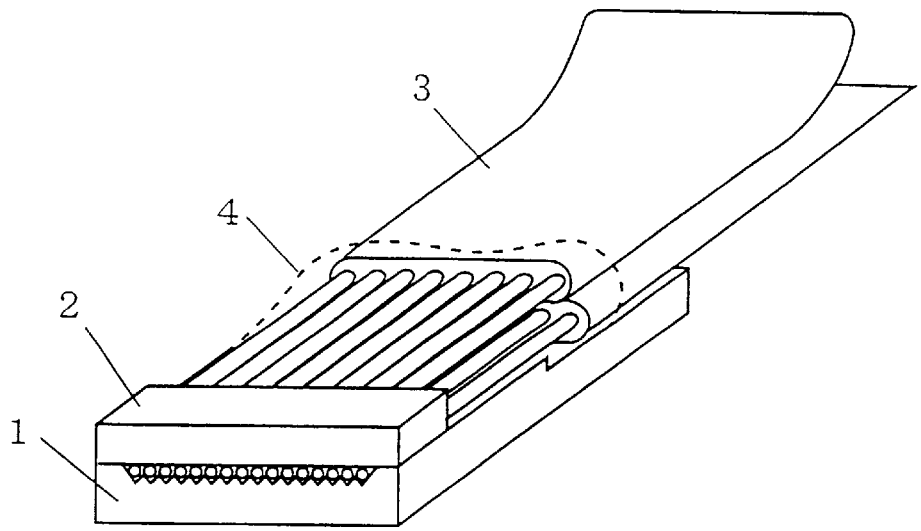
FIG. 7 shows a fiber optic connector according to a fifth embodiment of the present invention.
Figure 7:
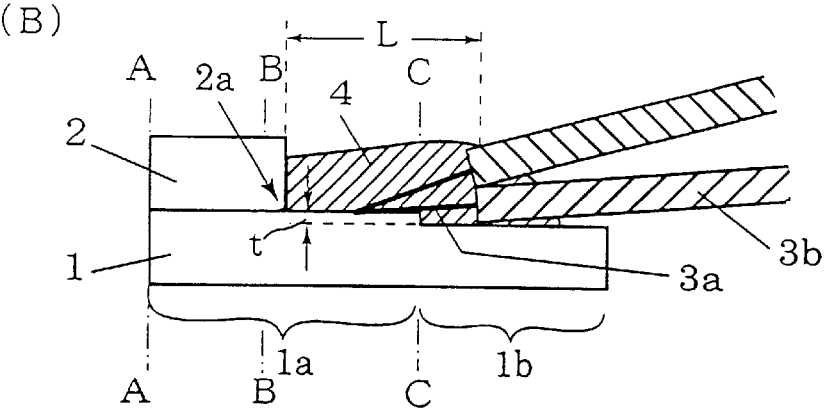
Figure 7:
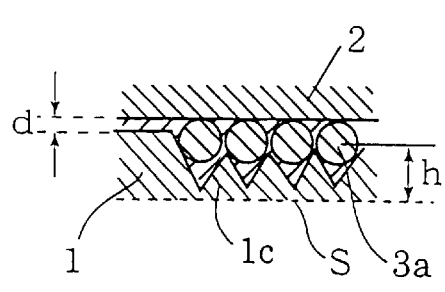
Figure 7:
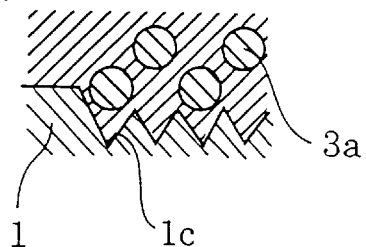

FIG. 7 shows a fiber optic connector according to the fifth embodiment of the present invention. In this embodiment, the fiber optic connector is constructed such that two optical fiber ribbons 3 of eight fibers each are layered on top of each other and placed on part B 1b of the substrate 1, the upper and lower fiber ribbons are shifted by ½ pitch so that at the front tips of the bare portion of optical fibers the upper and lower bare portion of optical fibers line up in alternating pairs on the same plane, and the front tips of the bare portion 3a of optical fibers are fixed by the fiber pressing member 2. The sequence density of the fibers at the front end of the fiber optic connector is higher than the fiber sequence density in the coated portion 3b.

A fiber ribbon used for an example of this embodiment is comprised of eight optical fibers having an 125 μm outside diameter of bare portion and 250 μm outside diameter of coated portion which are stuck together in a row and coated with a common coating. Estimating a standard deviation of the outside diameter of the bare portion of optical fibers to be 1 μm, the spaces in the fiber arranging grooves in part A 1a of the substrate are set to 127 μm. The arranging spaces for the optical fibers in the coated portion of one fiber ribbon are 250 μm and the arranging spaces for the fibers in the front end of the fiber optic connector are 127 μm.

The bare portion of optical fibers are arranged in the fiber arranging grooves of part A 1a of the substrate at the front end of the fiber optic connector and fixed in the designated space with the fiber pressing member 2. The coated portion of the fiber ribbons 3 (the protective coating and the common coating) rest on part B 1b of the substrate 1, but the step t between part B 1b and part A 1a of the substrate is set such that in the lower fiber ribbon the central axis of the fibers on part B 1b of the substrate is higher than the central axis of the bare portion of optical fibers at the front end of part A 1a of the substrate, as shown in FIG. 7(B). The smaller t is, the higher above the former, but the higher above it is, the smaller the radius of curvature of the bend in the bare portion of optical fibers of the upper fiber ribbon, and the rate of breakage of the bare portion of optical fibers due to static fatigue will increase as well as damage due to the bend. In order to increase the radius of curvature, the length L of the bare portion of optical fibers from the rear end of the fiber pressing member 2 to the front end of the coated portion 3b can be increased, but the fiber optic connector must be lengthened accordingly, resulting in high costs. Therefore, L should remain under 10 mm.

In order to prevent bending at the border between the bare portion and coated portion of optical fibers, the rear ends of the two fiber ribbons can be fixed facing upward at a slant.

Having considered the above conditions, an example was produced such that t=0.15 mm and L=10.0 mm. This time, the central axis of the fibers in the lower fiber ribbon (0.32 mm thick) at the rear end of part A of the substrate was 0.03 mm above the front end of the connector. In this condition, the bare portion 3a of optical fibers are raised at the rear end of the fiber arranging grooves 1c and do not contact the rear end edge of the fiber arranging grooves 1c, as shown in FIG. 7(D).

If we ignore the space d between the upper surface of the substrate 1 and the lower surface of the fiber pressing member 2 in FIG. 7(C), step t is expressed as:

(outside diameter of bare portion of fiber)+(coating thickness)>t

However, if we consider the space d, then:

(outside diameter of bare portion of fiber)+(coating thickness)−d>t

In other words, the height of the upper surface S of part B 1b of the substrate (shown as a dotted line in FIG. 7(C)) is lower than the height of the central axis of the bare portion of optical fibers placed on the front end of part A 1a of the substrate 1 by h, which satisfies the following equation:

(radius of bare portion of fiber)+(coating thickness)>h

Here, h is a difference between the height of the central axis of bare portion of the optical fibers at the front part on the part A 1a of the substrate and the height of the upper surface S of part B 1b.

Because the substrate 1, the fiber ribbons 3, and the fiber pressing member 2 are fixed with an adhesive 4 in the fiber optic connector, the adhesive fills the space between the fiber arranging grooves 1c and the bare portion of optical fibers that are raised up at the rear of the fiber arranging grooves. As a result, the position of the optical fibers will shift upward and downward and to the right and left as the adhesive contracts as it hardens or as it expands and contracts due to temperature changes in the environment. However, because the bare portion 3a of optical fibers do not contact the rear end edge of the fiber arranging grooves and the adhesive acts as a cushioning agent, no localized stress is placed on the bare portion 3a of optical fibers. Further, when the fibers are attached to the substrate, their position may shift to the left or right, but the same stress prevention function is seen in this case as well.

The radius of curvature of the bare portion of optical fibers of the upper fiber ribbon is 20 mm in the above example. According to the theoretical calculation (#1) below which shows the relationship of the breakage rate to the radius of curvature, if 20 mm is the minimum radius of curvature the breakage rate of the bare portion of optical fibers over 30 years is 1%, which is not a deterrent for practical use.

(Calculation #1)

$$F = 1 - \exp\left[-N_p \cdot L\left\{\left(1 + \left(\frac{\sigma_s}{\sigma_p}\right)^n \cdot \frac{t_s}{t_p}\right) \div \left(1 + K \frac{B}{\sigma_p^2 \cdot t_p}\right)\right\}^{\frac{m}{n-2}} - 1\right]$$

| | |
|---|---|
| F: | breakage rate of bare portion of optical fibers |
| $N_p$: | number of breakage per unit length in proof test |
| L: | length of bare portion of optical fibers |
| $\sigma_s$, $t_s$: | environmental stress, lifetime guarantee time |
| $\sigma_p$, $t_p$: | stress, time in proof test |
| m: | Weibull distribution constant |
| K: | fatigue constant |
| n, B: | crack growth parameter |

In an example, 0.127 mm V-shaped fiber arranging grooves were processed in a silicon substrate with a dicer using a 60° blade with a V-shaped tip to a depth of 0.17 mm. When the bare portion of optical fibers are placed in these fiber arranging grooves on the substrate, they are almost completely hidden in the grooves and only approximately 20 μm protrude from the upper surface of the substrate. When the bare portion of optical fibers placed in the fiber arranging grooves are pressed down with the fiber pressing member, the fiber pressing member contacts the protruding portion. As a result, the bare portion of optical fibers are contacted at three points, by the fiber pressing member and both sides of the fiber arranging grooves, and are arranged precisely in 0.127 mm spaces.

Figure 8:
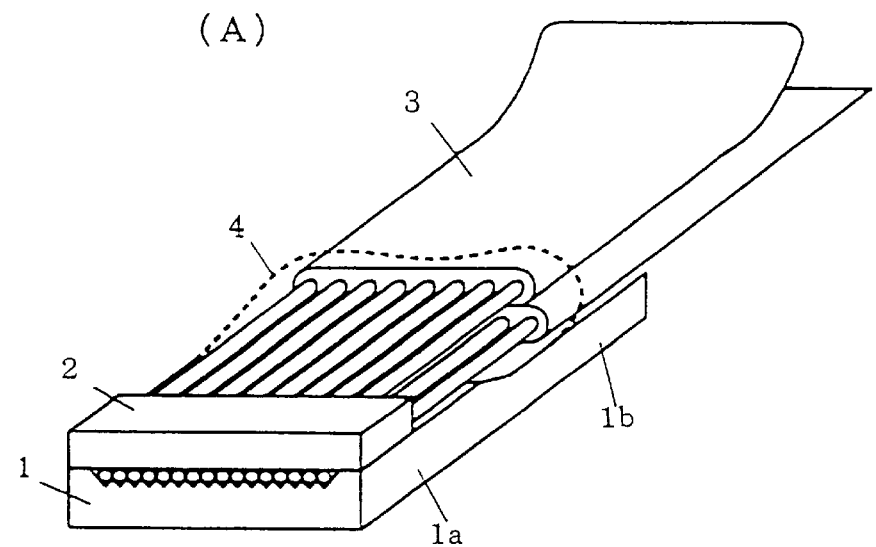
FIG. 8 shows a fiber optic connector according to a sixth embodiment of the present invention.
Figure 8:
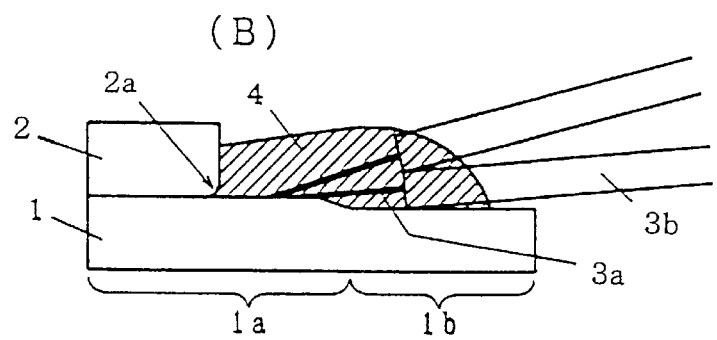

FIG. 8 shows a fiber optic connector according to the sixth embodiment of the present invention. In this embodiment, the rear end of part A 1a of the substrate 1 is slanted and accordingly the fiber arranging grooves also are diagonally sliced off. The step between part A 1a and part B 1b of the substrate 1 is formed to satisfy the following equation:

(radius of bare portion of fiber)+(coating thickness)≧h.

Figure 9:
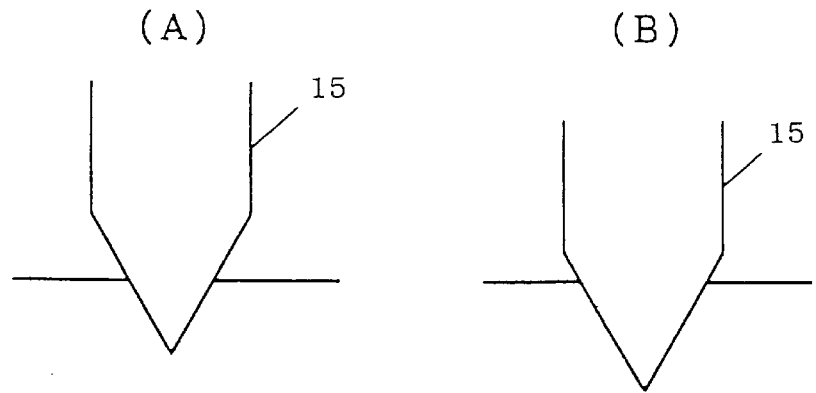
FIG. 9 shows a manufacturing method of the fiber optic connector according to a seventh embodiment of the present invention.

FIG. 9 shows a manufacturing method of the fiber optic connector according to the seventh embodiment of the present invention. In this embodiment, the width and depth of the grooves are increased continuously at the rear end of part A 1a of the substrate 1. This kind of fiber optic connector can be produced by a method in which a substrate is formed from glass or resin. If such a manufacturing method is used, a mold that can produce the above described grooves can be used. If processing with a dicer, it is possible to increase the depth and the width of the fiber arranging grooves at the same time by inserting a blade 15 of the dicer deeper than usual in the rear end of part A of the substrate, as shown in FIG. 9(A). The continuous increase of the width and depth of the grooves can be done in both a straight line or in a curve.

Figure 10:
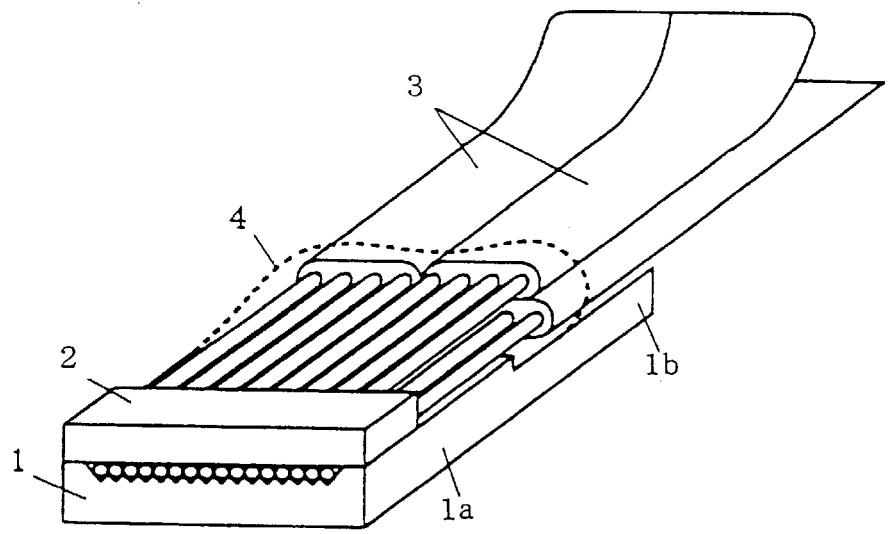
FIG. 10 is a perspective view showing a fiber optic connector according to an eighth embodiment of the present invention.

FIG. 10 is a perspective view showing a fiber optic connector according to the eighth embodiment of the present invention. In this embodiment, a 16-fiber fiber optic connector is produced using four fiber ribbons of four fibers each and layering two ribbons on top of the other two, shifting them by ½ pitch. The structure, which reduces the localized stress placed on the bare portion of optical fibers, is identical to that of above-mentioned embodiments and a description is omitted here.

Figure 11:
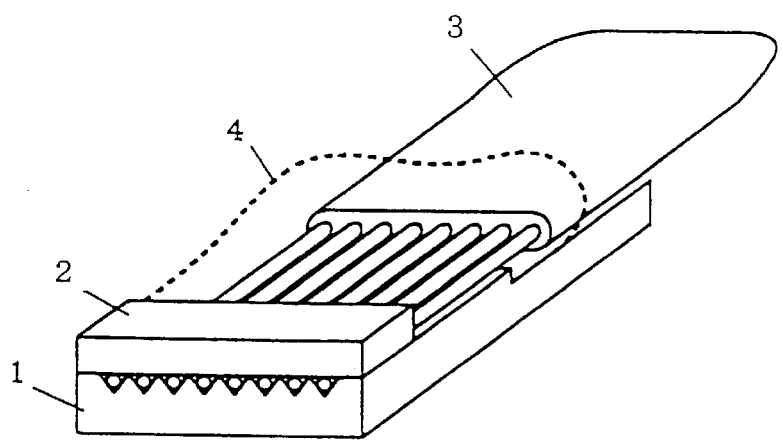
FIG. 11 shows a fiber optic connector according to a ninth embodiment of the present invention.
Figure 11:
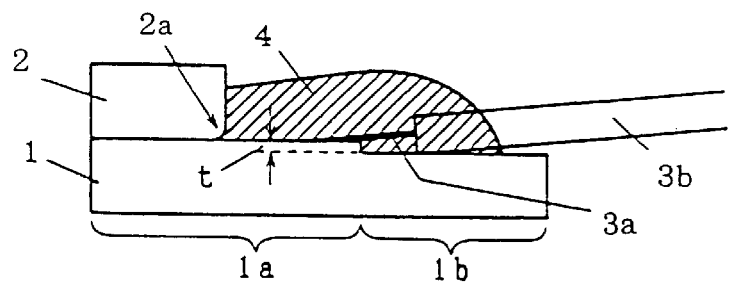

FIG. 11 shows a fiber optic connector according to the ninth embodiment of the present invention. The step t in this embodiment is identical to that shown in FIG. 7. In this embodiment, the upper fiber ribbon in the fifth embodiment shown in FIG. 7 has been omitted. Because only one fiber ribbon is being used, the space of the fiber arranging grooves in part A of the substrate can be set at 250 $\mu$m without estimating the standard deviation of the outside diameter because the bare portion of optical fibers do not contact each other. In this case, the arranging space of the fibers in the fiber optic connectors is 250 $\mu$m. Of course, a slightly larger space, for example 252–254 $\mu$m, can also be set estimating the standard deviation or changes in the arranging space of the fibers at the end where the coating has been removed. In this embodiment as well, the bare portion 3a of optical fibers are fixed such that they separate from the substrate 1 at the rear portion of the arranging grooves.

A fiber ribbon was used as optical fibers in the above embodiment, but one or more single fibers can also be used.

Figure 12:
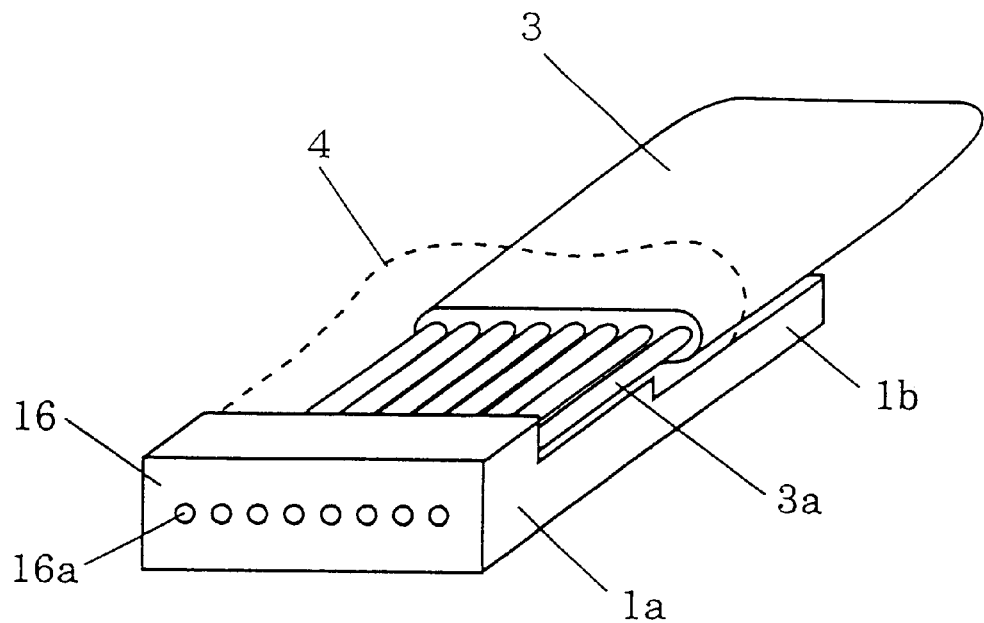
FIG. 12 shows a fiber optic connector according to a tenth embodiment of the present invention.
Figure 12:
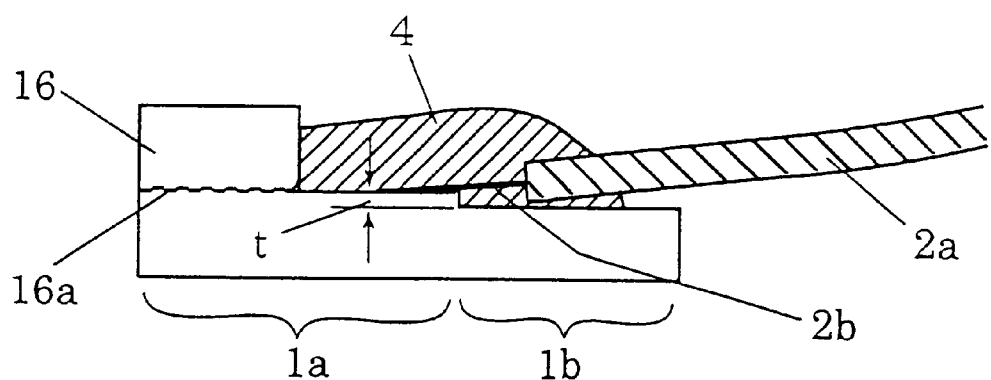

FIG. 12 shows a fiber optic connector according to the tenth embodiment of the present invention. In this embodiment, the substrate 16 is equivalent to the substrate 1 and the fiber pressing member 2 which are formed as an integral single unit in the same form as in the fifth embodiment shown in FIG. 7. Fiber arranging holes 16a are formed in part A 1a of the groove substrate 16 and the bare portion 3a of optical fibers are inserted into the fiber arranging holes 16a such that the tip ends of the bare portion are positioned at the end surface of the substrate 16. Fiber arranging grooves are formed continuously from the rear end of the fiber arranging holes 16a toward part B, and part A 1a of the substrate is thus constructed of the fiber arranging holes 16a and the fiber arranging grooves. By lowering the optical fibers onto the substrate, maintaining their central axis at a designated angle to the surface of the substrate, the bare portion of optical fibers are gradually put in the fiber arranging grooves in a straight line from the front end. When the length of the bare portion of optical fibers as a straight line is greater than the length of the fiber arranging holes, the bare portion of optical fibers are slid forward along the fiber arranging grooves, and inserted into the fiber arranging holes. The fiber arranging grooves also function as guides for inserting the bare portion 3a of optical fibers into the fiber arranging holes. In this embodiment, the bare portion 3a of optical fibers are fixed such that they separate from the substrate 16 at the rear portion of the arranging grooves.

In this embodiment as well, in stead of forming the step as shown in FIG. 7, the rear end of part A of the substrate can be processed diagonally as in the sixth embodiment shown FIG. 8, or the depth and width of the fiber arranging grooves can be increased continuously at the rear end portion of part A of the substrate as in the seventh embodiment.

Figure 13:
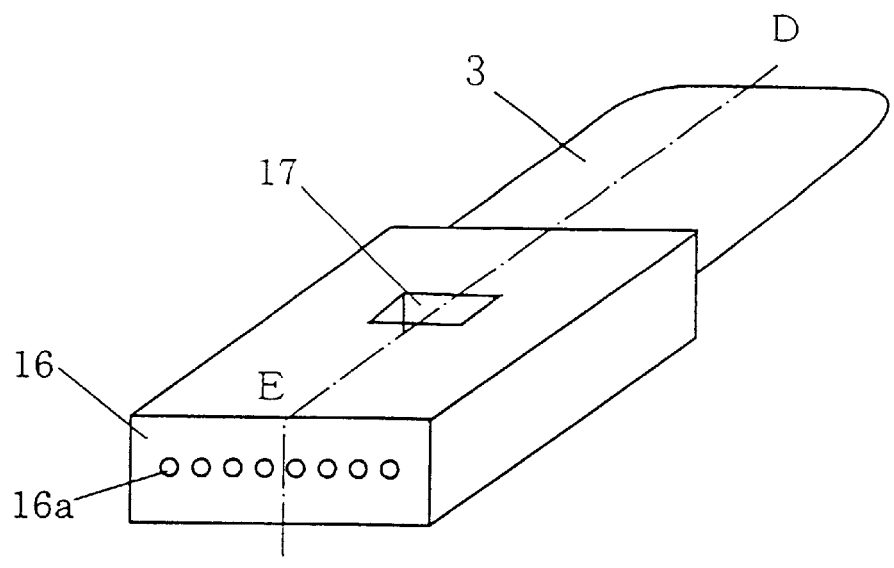
FIG. 13 shows a fiber optic connector according to an eleventh embodiment of the present invention.
Figure 13:
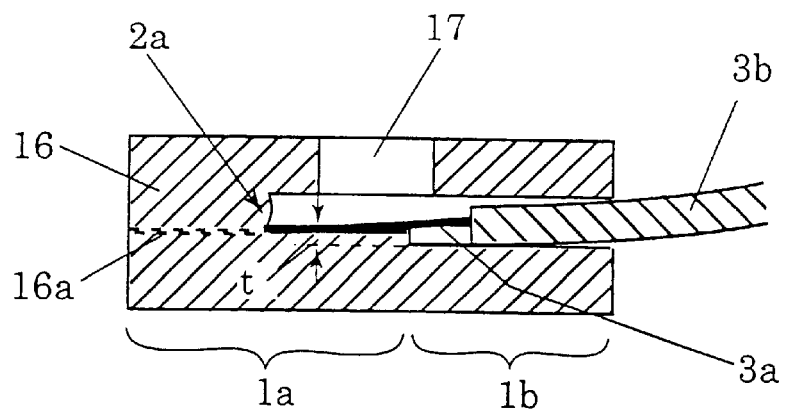

FIG. 13 shows a fiber optic connector according to the eleventh embodiment of the present invention. In this embodiment, the upper portion in the tenth embodiment shown in FIG. 12 is extended to cover part B of the substrate as well. An adhesive injection hole 17 is added for injecting adhesive. Step t is the same as shown in FIG. 7 and the structure of part A of the substrate is the same as that shown in FIG. 12.

Figure 14:
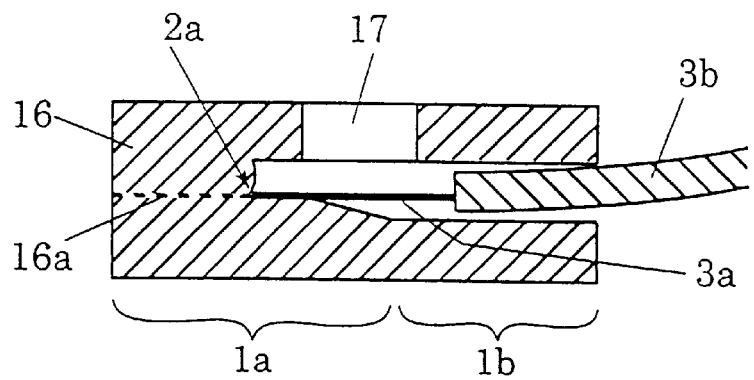
FIG. 14 is a cross section showing a fiber optic connector according to a twelfth embodiment of the present invention, which corresponds to a cross section along the D–E–F line of FIG. 13(A).

FIG. 14 shows a fiber optic connector according to the twelfth embodiment of the present invention. In this embodiment, in the eleventh embodiment shown in FIG. 13, the rear end of part A of the substrate is processed at a slant as in the sixth embodiment shown in FIG. 8. Further, the depth and width of the fiber arranging grooves is increased together at the rear end of part A of the substrate as in the seventh embodiment.

Figure 15:
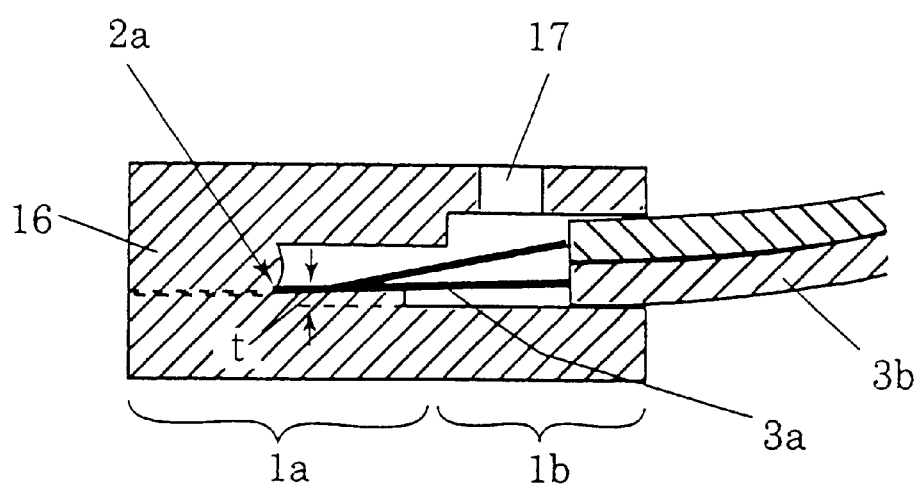
FIG. 15 is a cross section showing a fiber optic connector according to a thirteenth embodiment of the present invention, which corresponds to a cross section along the D–E–F line of FIG. 13(A).
Figure 16:
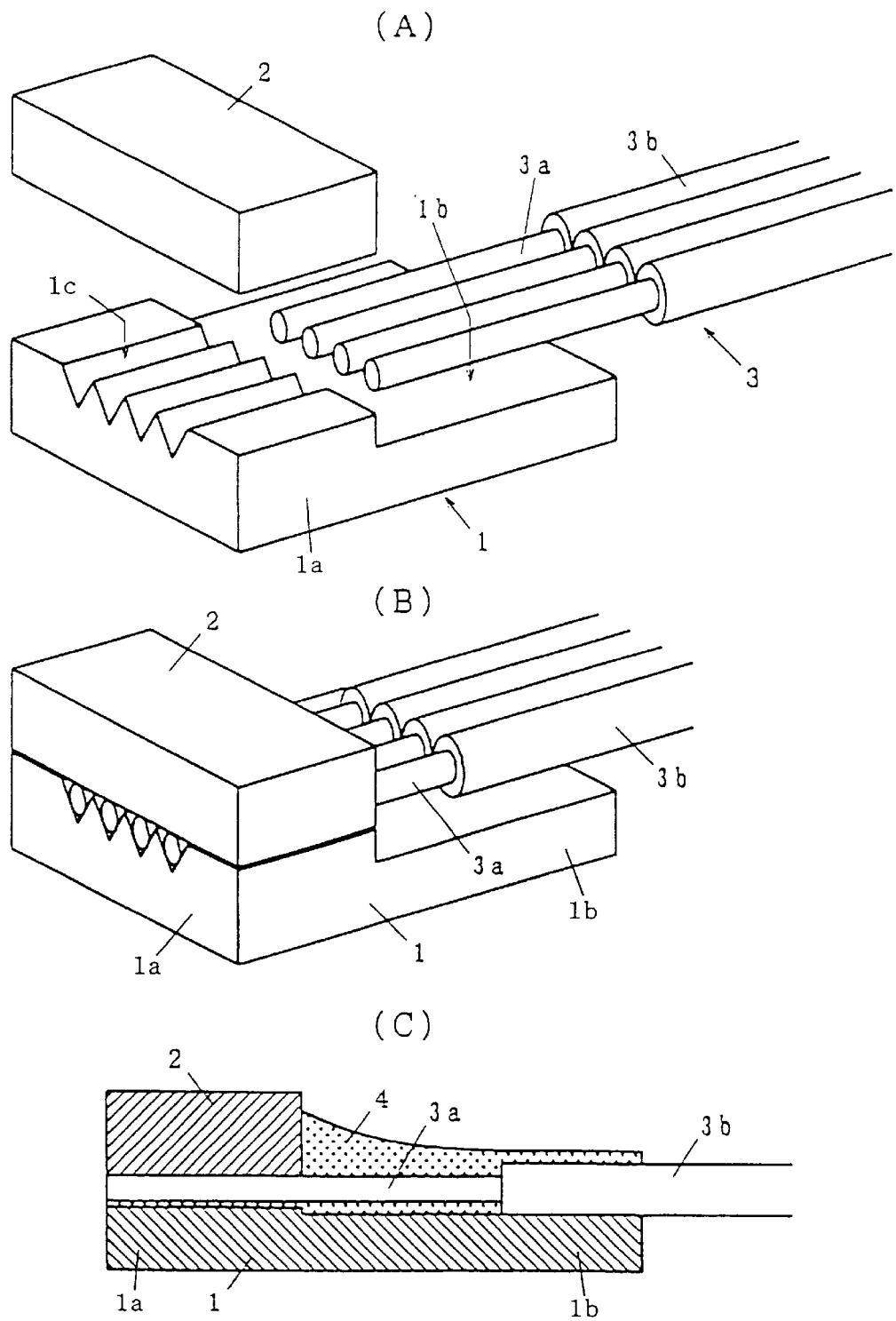
FIG. 16 shows one example of a fiber optic connector.

FIG. 15 shows a fiber optic connector according to the thirteenth embodiment of the present invention. In this embodiment fiber ribbons in two layers are used as the optical fibers in the fiber optic connector according to the eleventh embodiment of the present invention shown in FIG. 13. A double-density fiber optic connector is thus obtained as compared with the eleventh embodiment. The placement of the two layers of fiber ribbons is identical to that shown in FIGS. 7 and 10.

A fiber optic connector thus obtained is compact and of low cost and exhibits high reliability, with a low rate of breakage in the bare portion of optical fibers.

In the above embodiments, a plate made of silicon, ceramic, glass, or resin with a high filler content is used as the substrate. However, if the connector is used connected to a silica waveguide, the material of the substrate should have a heat expansion constant that is close to the heat expansion constant of silica glass. Provided that bare portion of optical fibers can be arranged in a designated space with the fiber pressing member, the shape of the fiber arranging grooves is insignificant, V-shaped, U-shaped, or rectangular.

For the fiber pressing member, a material with an expansion factor close to that of the bare portion of optical fibers is desirable. Further, the fiber pressing member, the substrate, and the optical fibers are fixed with an adhesive. Even if the substrate is opaque, if the fiber pressing member is transparent, a UV hardening adhesive can be used, which is convenient as it reduces the manufacturing time.

What is claimed is:

1. A fiber optic connector comprising a substrate and a pressing member, in which one or more optical fibers are fixed in a manner that at least part of bare portion of one or more optical fibers are fixed with an adhesive under the fiber pressing member and respectively in one or more fiber arranging grooves which are formed, extending to the rear of the fiber pressing member, on a part of the substrate, and the remaining bare portion of the optical fibers are fixed with the adhesive such that they are stuck in the fiber arranging grooves within a designated range at the rear of the fiber pressing member but gradually separate therefrom beyond the designated range, and the coated portion of the optical fibers are fixed with the adhesive at a slant position on or above the upper surface of the remaining part of the substrate.

2. A fiber optic connector according to claim 1, wherein the optical fibers are arranged in the form of two fiber ribbons piled on top of each other and shifted by ½ of the space between adjoining optical fibers and the bare portion of optical fibers from each fiber ribbon are arranged in alternating pairs.

3. A fiber optic connector according to claim 1, wherein the minimum radius of curvature of the bare portion of optical fibers at the rear end of the fiber pressing member is not less than 20 mm.

4. A fiber optic connector according to claim 1, wherein the length of the bare portion of optical fibers from the rear end of the fiber pressing member to the front end of the coated portion of the optical fibers is not more than 10 mm.

5. A fiber optic connector according to claim 1, wherein the upper surface of said remaining part of the substrate is lower than the height of the central axis of the bare portion of optical fibers placed on the front end of siad part of the substrate 1 by h, which satisfies the following equation:

$$(\text{radius of bare portion of fiber}) + (\text{coating thickness}) > h.$$

6. A fiber optic connector according to claim 1, wherein the surface of the substrate is processed such that the rear portion of said part of the substrate becomes continuously lower at a slant across a designated length toward said remaining part of the substrate.

7. A fiber optic connector according to claim 1, wherein the depth and width of the fiber arranging grooves are continuously increased toward the rear across a designated length in the rear portion of said part of the substrate.

8. A fiber optic connector comprising a substrate having one or more fiber arranging holes, in which one or more optical fibers are fixed in a manner that at least part of bare portion of the optical fibers are respectively fixed with an adhesive in the fiber arranging holes formed in a part of the substrate and the remaining bare portion of the optical fibers are fixed with the adhesive such that they are stuck in fiber arranging grooves, which are formed continuously to the fiber arranging holes on a part of the substrate, within a designated range at the rear of the fiber arranging holes but gradually separate therefrom beyond the designated range, and the coated portion of the optical fibers are fixed with the adhesive at a slant position on or above the upper surface of the remaining part of the substrate.

9. A manufacturing method of a fiber optic connector, which is characterized in that one or more optical fibers from which the coatings in their front tips have been removed to expose their glass portion are lowered with an angle of not less than 2° maintained between the central axis of the optical fibers and the upper surface of the substrate, and are fixed to the substrate at an angle formed as small as possible, not exceeding 20°, between the central axis of coated portion of the optical fibers and the upper surface of the substrate in a manner that at least part of bare portion of one or more optical fibers are fixed with an adhesive under the fiber pressing member and respectively in one or more fiber arranging grooves which are formed, extending to the rear of the fiber pressing member, on part of the substrate, and the remaining bare portion of the optical fibers are fixed with the adhesive such that they are stuck in the fiber arranging grooves within a designated range at the rear of the fiber pressing member but gradually separate therefrom beyond the designated range, and the coated portion of the optical fibers are fixed with the adhesive at a slant position on or above the horizontal surface of the remaining part of the substrate.

10. A manufacturing method of a fiber optic connector, which is characterized in that one or more optical fibers from which the coatings in their front tips have been removed to expose their glass portion are lowered with an angle of not less than 2° maintained between the central axis of the optical fibers and the upper surface of the substrate, and are fixed to the substrate at an angle formed as small as possible, not exceeding 20°, between the central axis of coated portion of the optical fibers and the upper surface of the substrate in a manner that at least part of bare portion of the optical fibers are respectively fixed with an adhesive in the fiber arranging holes formed in a part of the substrate and the remaining bare portion of the optical fibers are fixed with the adhesive such that they are stuck in fiber arranging grooves, which are formed continuously to the fiber arranging holes on a part of the substrate, within a designated range at the rear of the fiber arranging holes but gradually separate therefrom beyond the designated range, and the coated portion of the optical fibers are fixed with the adhesive at a slant position on or above the horizontal surface of the remaining part of the substrate.

* * * * *